United States Patent [19]

Sumpter et al.

[11] Patent Number: 5,223,344
[45] Date of Patent: Jun. 29, 1993

[54] HEAT CURABLE PLATINUM CATALYZED SILICONE COATING COMPOSITIONS

[75] Inventors: Chris A. Sumpter; Larry N. Lewis, both of Scotia; Judith Stein, Schenectady; James V. Crivello, Clifton Park; Mingxin Fan, Troy, all of N.Y.

[73] Assignee: General Electric Company, Waterford, N.Y.

[21] Appl. No.: 811,188

[22] Filed: Dec. 20, 1991

[51] Int. Cl.$^5$ .............................................. B32B 9/04
[52] U.S. Cl. ........................... 428/447; 428/451; 428/452; 427/387; 528/15; 528/31
[58] Field of Search ............... 528/15, 31; 428/447, 428/451, 452; 427/387

[56] References Cited

U.S. PATENT DOCUMENTS

| | | | |
|---|---|---|---|
| Re. 31,727 | 11/1984 | Eckberg | 428/429 |
| 2,823,218 | 2/1958 | Speier et al. | 528/15 |
| 3,336,239 | 8/1967 | Bailey et al. | 252/430 |
| 3,775,452 | 11/1973 | Karstedt | 260/429 |
| 4,288,345 | 9/1981 | Ashby et al. | 252/431 |
| 4,340,710 | 7/1982 | Brown, Jr. | 528/15 |
| 4,421,903 | 12/1983 | Ashby | 528/15 |
| 4,465,818 | 8/1984 | Shirahata et al. | 528/12 |
| 4,526,953 | 7/1985 | Dallavia, Jr. | 528/15 |
| 4,559,396 | 12/1985 | Sasaki et al. | 528/15 |
| 4,614,812 | 9/1986 | Schilling, Jr. | 556/406 |

OTHER PUBLICATIONS

Larry N. Lewis & Richard J. Uriarte, Hydrosilylation Catalyzted by Metal Colloids, Organometallics, 1990, 9, 621–625.
Larry N. Lewis, On the Mechanism of Metal Colloid Catalyzed Hydrosilyation, J. Am. Chem. Soc., vol. 112, No. 16, 1990, 5998–6004.

*Primary Examiner*—Melvyn I. Marquis

[57] ABSTRACT

The present invention discloses the use of certain silicon hydrides having at least two hydrogen atoms attached to silicon in particular heat curable platinum catalyzed silicone coating formulations, which permits the use of a reduced level of inhibitor and improved cure performance.

43 Claims, No Drawings

HEAT CURABLE PLATINUM CATALYZED SILICONE COATING COMPOSITIONS

The present invention relates to a heat curable silicone coating composition. More particularly, the present invention relates to a heat curable silicone coating composition having an accelerated cure rate. Most particularly, the present invention relates to the use of small amounts of an additive which contains silicon bound to greater than or equal to two hydrogens to accelerate the rate of cure of addition curable silicone material.

BACKGROUND OF THE PRESENT INVENTION

The present invention relates to heat curable organopolysiloxane fluids well known in the art which utilize a silicon hydride siloxane fluid, silicon vinyl siloxane fluid, an effective amount of a platinum catalyst, an inhibitor which prevents premature gelation and a cure accelerator composed of silicon dihydride and trihydride monomers. More particularly the present invention relates to the use of the silicon dihydrides and trihydrides which accelerate the cure of addition cure silicone formulations. These formulations are useful as release coatings on paper, plastic, and similar substrates. These formulations are also useful as potting compounds, conformal coatings of electronic parts, etc.

Special mention is made of Schilling, Jr., U.S. Pat. No. 4,614,812 and Lewis, L. N. et al., *J. Am. Chem. Soc.*, vol. 108, pp. 7228 (1986) which have reported that the use of small quantities of an SiH compound accelerates the rate of addition cure silicones.

Recently it has been shown that platinum catalyzed hydrosilation of $R_2SiH_2$ or $RSiH_3$ containing silanes is difficult or nearly impossible to carry out. In Lewis et al., *Organometallics*, vol. 9, pp. 621-25 (1990), it was reported that the $SiH_2$ or $SiH_3$ poisoned the platinum catalyst.

Surprisingly, contrary to the suggestions of the prior art, the present applicants have now found that the addition of small amounts of $SiH_2$ and/or $SiH_3$ acts to accelerate the rate of cure of platinum catalyzed addition curable silicone materials. This is entirely unexpected in light of the teachings of the prior art that the di and tri hydride silanes are poisons to the platinum catalyst. As shown in the working examples, hereinbelow, the addition of the $R_2SiH_2$ and/or $RSiH_3$ silane additives to a platinum catalyzed addition curable silane system accelerates the cure of the silane so that curing is effected at faster rates and at lower temperatures than silane curing systems of the prior art.

SUMMARY OF THE INVENTION

According to the present invention there is provided a heat curable silicone composition comprising (a) a vinyl containing polydiorganosilicone fluid; (b) an effective amount of a crosslinking silicone hydride containing polydiorganosilicone; (c) an effective amount of a platinum group metal catalyst; and (d) a small effective amount of a silane additive which comprises silicon bound to greater than or equal to two hydrogen atoms. Preferably, the heat curable silicone composition also comprises (e) an inhibiting agent.

Also according to the present invention there is provided a method for preparing a heat curable silicone composition comprising mixing (a) a vinyl containing polydiorganosilicone fluid; (b) an effective amount of a crosslinking silicone hydride containing polydiorganosilicone; (c) an effective amount of a platinum group metal catalyst; and (d) a small effective amount of a silane additive which comprises silicon bound to greater than or equal to two hydrogen atoms. Preferably, the method also comprises the addition of (e) an effective amount of an inhibiting agent.

In preferred embodiments, the vinyl containing polydiorganosilicone fluid (a) is a vinyl containing polydimethylorganosilicone fluid; the silicone hydride polydiorganosilicone (b) is a polydimethylsilicone fluid; the platinum group metal catalyst (c) comprises a platinum catalyst, said silane additive (d) comprises diphenylsilane or phenylsilane; and the inhibiting agent (e) is selected from diallylmaleate, dimethylmaleate and mixtures thereof.

DETAILED DESCRIPTION OF THE PRESENT INVENTION

The present invention provides heat curable silicone compositions. The addition curable compositions are comprised of a mixture of several ingredients which can be coated upon a substrate such as paper and when cured thereon will form a coating on the substrate. In addition, these silicone compositions can be cured in bulk to be used as bumper gels, potting compounds, etc.

Component (a) of the compositions of the present invention are vinyl containing polydiorganosiloxane base polymers which are generally comprised of siloxane units having substituent groups including lower alkyl radicals having up to about 8 carbon atoms such as methyl, ethyl, propyl, isopropyl, etc., and monovalent alkenyl radicals of from about 2 to 20 carbon atoms such as vinyl, allyl, butenyl, etc., including cycloalkenyl. These polymers are prepared by methods known in the art and are commercially available with varying degrees of functionality. They generally have a viscosity ranging from about 50 to about 100,000 centipoise at 25° C.

Preferred diorganopolysiloxane base polymers (a) of the present invention are vinyl-chainstopped diorganopolysiloxanes having the general formula:

$$M^{vi}D_xM^{vi} \text{ or } M^{vi}D_xD_yM^{vi}$$

wherein $M^{vi}$ comprises

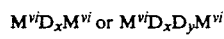

units, $D_x$ comprises

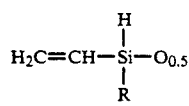

units, $D_y$ comprises

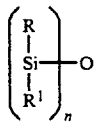

units and wherein R is, independently, a monovalent hydrocarbon radical free of unsaturation having up to about 8 carbon atoms, $R^1$ is a hydrocarbon radical having alkenyl unsaturation of from 2 to 20 carbon atoms, and m and n are positive integers such that said vinyl containing silicone fluid has up to about 20% by weight $R^1$ groups. Most preferably the R groups will be methyl, the $R^1$ groups will be vinyl, and the viscosity of the polymers will range from about 300 to about 5000 centipoise at 25° C. Most preferred is a vinyl containing polydimethylsilicone.

The SiH-containing polysiloxanes for use herein as crosslinking agents are comprised primarily of compounds having the general formula:

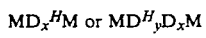

wherein each M is a unit of the formula $R_3SiO_{0.5}$ wherein each R is independently as defined above; where $D_x$ is as described above and where $D^H$ is an

unit where R is as described above. Such polysiloxanes will include, for example, cyclic polymers such as sym-tetrahydrotetramethylcyclotetrasiloxane, or linear polymers such as alkylhydrogen-siloxane fluids or polydialkyl-alkylhydrogen siloxane copolymers. Particularly useful as crosslinking agents for the present invention are trimethyl-chainstopped polymethylhydrogen siloxane fluids having from approximately 10% to 100% SiH groups and having a viscosity in the range of from about 15 to about 1,000 centipoise at 25° C.

The curing reaction which takes place between the vinyl-functional polysiloxane base polymer and the SiH-containing crosslinking agent is an addition cure reaction, known as hydrosilation. The compositions of the present invention may be thermally cured by means of a platinum group metal catalyzed crosslinking reaction between the vinyl groups of the base polymer and the SiH reaction sites of the crosslinker.

Suitable hydrosilation catalysts to be employed in the present invention are known to persons skilled in the art and include platinum group metal catalysts utilizing such precious metals as ruthenium, rhodium, palladium, osmium, iridium and platinum, and complexes of these metals. Preferred are platinum metal catalysts. Examples of such hydrosilation catalysts are described in, inter alia, Lamoreaux, U.S. Pat. No. 3,220,972; Karstedt, U.S. Pat. Nos. 3,715,334; 3,775,452 and 3,814,730; Ashby, U.S. Pat. Nos. 4,421,903; and 4,288,345; and Saruyama et al., U.S. Pat. No. 5,057,476.

The selection of the particular catalyst will depend upon such factors as speed of reaction desired, expense, useful shelf-life, useful pot-life and the temperature at which the cure reaction is to take place. The amount of catalyst employed is not critical, so long as proper crosslinking is achieved; however, as indicated above, the high cost of these precious metal catalysts makes their conservative use obligatory. As with any catalyst, it is preferable to use the smallest effective amount possible, for the coating compositions described herein, enough total catalyst is used to provide from about 5 to about 500 parts per million of precious metal as precious metal.

Essential to the practice of the instant invention is the use of the silane cure accelerator additive. The silane additives of the present invention are those having at least two hydrogen atoms bonded to the silicon atom. Preferred are those having the general formula $R^2_2SiH_2$ and $R^2SiH_3$ where $R^2$ is selected from the group consisting of alkyl radicals; halides such as chlorine, bromine and iodine; cycloalkyl radicals and phenyl radicals.

Typically the silane cure accelerator additives are selected from silanes such as, but not limited to, dichlorosilane, dimethylsilane, diethylsilane, dipropylsilane, dibutylsilane, dipentylsilane, dihexylsilane, diheptylsilane, dioctylsilane, dinonylsilane, didecylsilane, dicyclopentylsilane, dicyclohexylsilane, dicycloheptylsilane, diphenylsilane, phenylchlorosilane, phenylethylsilane, methyloctylsilane, methyldecylsilane, phenylmethylsilane, phenylethylsilane, phenylcyclohexylsilane and methylcycloheptylsilane. Preferred are diphenylsilane, phenylsilane, dioctylsilane, methyldecylsilane, phenylmethylsilane and didecylsilane. Most preferred is diphenylsilane and phenylsilane.

The silane cure accelerator additives are employed in small effective amounts. Typically the silane cure accelerator additive is present in the compositions of the present invention in amounts ranging from about 0.25 to about 20 moles of silane to moles of catalyst metal, most preferably from about 0.5 to about 5 moles of silane to moles of catalyst metal.

The compositions of the present invention also may comprise (e) an inhibiting agent. These serve to prevent premature cure in one-package systems and also extend the shelf-life of stored products and the pot-life of products in use. That is, at room temperature, the complete silicone composition will not gel prematurely, as often happens with catalyzed silicone compositions. Especially useful are dialkyl and dialkenylcarboxylic ester inhibitors such as diallylmaleate and dimethylmaleate. These are known to those skilled in the art and are described in U.S. Pat. No. 4,256,870.

Additional inhibitors useful in the practice of the present invention include but are not limited to acetylenic alcohols such as those described in U.S. Pat. No. 3,445,420; amines such as those described in U.S. Pat. No. 4,584,361; isocyanurates such as those described in U.S. Pat. No. 3,882,083; ene-ynes such as those described in U.S. Pat. No. 4,465,818; vinyl acetates such as those described in U.S. Pat. No. 4,476,166; and acetylene dicarboxylates such as those described in U.S. Pat. No. 4,347,346.

Additional ingredients may be added to the curable compositions of the present invention to lend specific properties and allow the compositions to be tailored to an end-user's needs. For example, the compositions may be dispersed in a solvent or used in a 100% solids formulation, as required.

Vinyl gum cure accelerators, such as those described in Eckberg, U.S. Pat. No. Re. 31,727, can be added to the compositions of the present invention. Adding from about 0.5 to about 10 weight percent based on the total weight of the base polymer of the vinyl gum reduces the required curing time.

Other conventional additives, such as controlled release additives ("CRAs"), anti-microbial agents, anti-foaming agents and other additives familiar to persons skilled in the art are also contemplated by the present disclosure.

Fillers and additives to improve the thermal stability, weather resistance, chemical resistance, flame retardancy or mechanical strength or to reduce the degree of gas permeation can also be added. Examples of these fillers and additives include fumed silica, quartz powder, glass fiber, carbon black, alumina, metal oxides such as iron oxide and titanium oxide and metal carbonates such as calcium carbonate and magnesium carbonate. Moreover, suitable pigments, dyes, blowing agents or antioxidants can be added within a range which does not interfere with the curing process.

The components of the present invention, along with suitable additives are mixed together. The curable silicone coating compositions of the present invention will cure to a tack-free, smear-free condition on brief exposure to temperatures in the range of from about 90° to about 300° C. The compositions of the present invention remain ungelled at ambient temperatures for at least 24 hours, but heat cure on useful substrates at temperatures below about 150° C., preferably below about 125° C., and most preferably below about 110° C. The heat cure reaction can be initiated by many ways such as by infrared lamps, but typically a forced air oven is most suitable. The compositions of the present invention can be applied to substrates in many ways such as by coating, spraying, brushing and application by blade or gravure processes. The present invention thus provides a method for rendering surfaces abhesive by application of the present coating compositions to a suitable substrate. Such substrates can include, but are not limited to, glass, metal, paper, polyethylene coated kraft (PEK) paper, super-calendered kraft (SCK) paper, polyethylene films, polypropylene films and polyester films.

These curable coatings thus have a wide variety of useful applications. Examples of such applications are as follows: potting materials, coating materials and molded products for the electrical and electronics industries; potting materials, coating materials and molded products for general industry; rubber for die molding; perforated sections for civil engineering and construction; seam sealants; molded products for medical applications; impression materials for dental applications and materials for liquid injection molding.

DESCRIPTION OF THE PREFERRED EMBODIMENTS

The following examples illustrate the present invention. They are not intended to limit the scope of the appended claims in any manner whatsoever. Cure is defined for the purpose of the instant specification and the examples below as a coating which will pass both the aggressive rub test and the 3M 610 tape test.

COMPARATIVE EXAMPLE A

A standard commercial formulation that contains 100 parts of a vinyl end stopped polydimethylsilicone fluid of formula $M^{vi}D_xM^{vi}$ having a viscosity of 420 cps, 0.25% by weight diallylmaleate (DAM), 75 ppm Pt as "Karstedt catalyst" (Karstedt, U.S. Pat. No. 3,775,452) and 4 parts by weight polydimethylsilicone fluid of formula $MD^H_xM$ having a viscosity of 20-40 cps is cured on super-calendered kraft (SCK) paper. The formulation cured at 115° C. in 15 seconds but would not cure at 115° C. at less than 15 seconds or at 105° C. for 30 seconds.

COMPARATIVE EXAMPLE B

An experimental commercial formulation containing 100 parts vinyl containing polydimethylsilicone fluid of formula $M^{vi}D_xM^{vi}$ having a viscosity of 285 cps, 0.55 percent by weight of DAM, 150 ppm "Ashby platinum catalyst" (Ashby et al., U.S. Pat. No. 4,288,345), and 2.6 parts of an SiH crosslinker of the formula $MD^H_xM$ having a viscosity of 20-40 cps was cured on SCK paper. The formulation gave a cured coating at 110° C. in 20 seconds, but did not give a cured coating if cured for less than 20 seconds at 110° C. or for 30 seconds at 100° C.

EXAMPLE 1

A formulation was prepared containing 100 parts of the $M^{vi}D_xM^{vi}$ fluid with a viscosity of 420 cps, 0.2% DAM, 75 ppm Pt as Karstedt catalyst, 0.019 parts of diphenylsilane ($Ph_2SiH_2$) and 4 parts $MD^H_xM$ crosslinker. The formulation became yellow upon addition of the silane. The formulation cured on SCK paper at 105° C. in 15 seconds.

EXAMPLE 2

A formulation containing 100 parts $M^{vi}D_xM^{vi}$ fluid having a viscosity of 285 cps, 0.3% DAM, 150 ppm Ashby catalyst, 0.005 parts phenylsilane ($PhSiH_3$) and 2.6 parts $MD^H_xM$ crosslinker. The formulation cured on SCK paper at 100° C. in 20 seconds. This formulation also turned yellow upon the addition of the SiH fluid.

It can be seen from Examples 1 and 2 and Comparative Examples A and B that the addition of a catalytic amount of the silane cure accelerator additive ($Ph_2SiH_2$ and $PhSiH_3$) gave new formulations which were stable at ambient temperatures and unexpectedly gave cured coatings at lower temperatures and shorter curing times. Smaller amounts of maleate inhibitor could be used in the formulations due to additional ambient temperature inhibition provided by the silane additive.

EXAMPLES 3-9

Various coating formulations are prepared following the procedures of Examples 1 and 2. The formulations were applied to SCK paper via a doctor blade and curing was effected in a forced air oven. For comparative purposes, samples were prepared without the silane cure accelerator additive.

Additionally, several of the samples were subjected to an accelerated aging test. A sample was considered to pass the test if the viscosity did not double after 4 hours at 40° C.

The compositional data and the results are set forth below in Table 1.

TABLE 1

| | Example | | | | | | | | |
|---|---|---|---|---|---|---|---|---|---|
| | C* | D* | 3 | 4 | 5 | 6 | 7 | 8 | 9 |
| Composition, pbw | | | | | | | | | |

TABLE 1-continued

| | Example | | | | | | | | |
|---|---|---|---|---|---|---|---|---|---|
| | C* | D* | 3 | 4 | 5 | 6 | 7 | 8 | 9 |
| Base Polymer[a] | 100 | — | 100 | 100 | 100 | — | — | — | — |
| Base Polymer[b] | — | 100 | — | — | — | 100 | 100 | 100 | 100 |
| Catalyst[c] | 75 | — | 75 | 75 | 75 | — | — | — | — |
| Catalyst[d] | — | 150 | — | — | — | 150 | 150 | 150 | 150 |
| Inhibitor[e] | 0.25 | 0.55 | 0.25 | 0.25 | 0.25 | 0.32 | 0.35 | 0.30 | 0.35 |
| Crosslinker[f] | 4 | 2.6 | 4 | 4 | 4 | 2.6 | 2.6 | 2.6 | 2.6 |
| Silane[g] | — | — | 0.019 | 0.010 | 0.050 | — | — | — | 0.005 |
| Silane[h] | — | — | — | — | — | 0.005 | 0.005 | 0.005 | — |
| Properties[i] | | | | | | | | | |
| Cure Temp. °C. | 115 | 110 | 110 | 105 | 120 | 100 | 100 | 100 | 105 |
| | 115 | 110 | — | — | — | — | — | — | 100 |
| | 105 | 105 | — | — | — | — | — | — | — |
| Cure Time, sec | 15 | 20 | 15 | 20 | 20 | 20 | 20 | 20 | 20 |
| | 10 | 15 | — | — | — | — | — | — | 30 |
| | 30 | 30 | — | — | — | — | — | — | — |
| Rub Test[j] | P | P | P | P | F | P | M | P | P |
| | F | F | — | — | — | — | — | — | F |
| | F | F | — | — | — | — | — | — | — |
| Tape Test | P | P | P | P | F | P | P | P | P |
| | F | F | — | — | — | — | — | — | F |
| | F | F | — | — | — | — | — | — | — |
| Viscosity[k], cps | | | | | | | | | |
| Initial | — | 337 | — | — | — | 312 | 306 | 322 | 316 |
| Post Aging | — | 590 | — | — | — | 682 | 492 | 1650 | 601 |

In Table 1 above, the superscript notations have the following meanings.
*Comparative Example
pbw = Parts by weight
[a]Vinyl end stopped polydimethylsiloxane fluid mixed with a siloxane gum. 420 cps viscosity
[b]Vinyl end stopped polydimethylsiloxane fluid, 285 cps viscosity
[c]Platinum complex catalyst prepared according to Karstedt. U.S. Pat. No. 3,775,452, in parts per million
[d]Platinum complex catalyst preapred according to Ashby et al., U.s. Pat. No. 4,288,345, in parts per million
[e]Diallylmaleate
[f]Polymethyl hydrogen siloxane, 20-40 cps viscosity, 1.6% H by weight
[g]Diphenylsilane, $Ph_2SiH_2$
[h]Phenylsilane, $PhSiH_3$
[i]Some formulations were tested at more than one cure level
[j]P is pass, M is marginal pass, F is fail
[k]Measured in a Brookfield viscometer Table 1 above demonstrates the significant increase in the acceleration of cure rates obtained upon addition of di- and trihydrosilanes to compositions without any additive.

EXAMPLE 10

To demonstrate improvements over the monohydride silicones of the prior art, a sample, 10, is prepared as in Example 6 above and a first comparative sample, E*, is also prepared as in Example 6 except that the $PhSiH_3$ is substituted with triphenylsilane ($Ph_3SiH$) at the same molar level.

A second comparative sample, F*, is prepared as in Example 2 except the inhibitor is used at the same level in the first comparative sample, E*, without the addition of any other silane.

The results, are shown below in Table 2.

TABLE 2

| | Example | | |
|---|---|---|---|
| | E* | F* | 10 |
| Composition, pbw | | | |
| Base polymer[a] | 100 | 100 | 100 |
| Catalyst[b] | 150 | 150 | 150 |
| Inhibitor[c] | 0.32 | 0.32 | 0.32 |
| Silane | 0.005[d] | — | 0.005[e] |
| Crosslinker[f] | 4 | 4 | 4 |
| Properties | | | |
| Cure Temp., °C. | 105 | 105 | 105 |
| Cure Time, sec | 20 | 20 | 20 |
| Rub Test | F | F | P |
| Tape Test | F | P | P |
| Viscosity (cps) | | | |
| initial | 292 | 284 | 283 |
| post-aging | gel[g] | gel[g] | 608 |

*Comparative Example
[a]vinyl end stopped polydimethylsiloxane fluid, 285 cps
[b]Platinum complex catalyst (Ashby) in ppm
[c]Diallylmaleate
[d]Triphenylsilane ($Ph_3SiH$)
[e]Phenyl silane ($PhSiH_3$)
[f]Polymethyl hydrogen siloxane, 20-40 cps, 1.6% H by weight
[g]Gelled in less than 4 hours The data in Table 2 above shows that substitution of phenylsilane of the present invention (10) with the triphenylsilane of the prior art (E*) causes a significant loss in the cure acceleration time.

EXAMPLE 11

The following examples show that the accelerating effect of the silane cure accelerating additives of the present invention occur in an addition cure silicone cured in bulk.

Control Example G*

For control purposes a formulation, G*, was prepared which contained 48 g of a $M^{vi}D_xM^{vi}$ fluid having a viscosity of 4000 cps, 10 ppm of platinum as Karstedt catalyst, 0.02 parts by weight of dimethyl maleate (DMM), and 4 parts by weight of an SiH crosslinker, $MD^H_xD_yM$, 0.8 percent H, viscosity of 20-40 cps. The time to gellation was measured in a Sunshine gel timer.

Example 11

A formulation, Example 11, was prepared as in control G* above except that 0.014 parts by weight of DMM were used and 0.006 parts by weight of phenyl silane were added.

Comparative Example H*

For comparative purposes, a formulation, comparative example H*, was prepared as in Control G*, except that 0.014 parts DMM were used and 0.012 parts Ph$_3$SiH were added. The results of the gel time measurements are set forth below in Table 3.

TABLE 3

|  | Example | | |
| --- | --- | --- | --- |
|  | G* | H* | 11 |
| Silane accelerator | — | Ph$_3$SiH | PhSiH$_3$ |
| Gel Time, at 54° in seconds | 475 | 476 | 398 |

*Comparative Example

The data in Table 3 above shows that the inclusion of the phenyl silane provided a significant improvement in cure time, while the Ph$_3$SiH had no accelerating effect.

The above-identified patents and publications are hereby incorporated by reference.

Many variations of the present invention will suggest themselves to those skilled in the art in light of the above detailed description. For example, a wide variety of vinyl containing polydiorganosilicone fluids in addition to polydimethylsilicone fluids can be employed. Further, instead of diphenylsilane, a number of other silane cure accelerating additives such as dioctylsilane, methyldecylsilane, phenylmethylsilane and didecylsilane may be used. In addition, phenylsilane, octylsilane, decylsilane and the like may be used as the accelerating agent. Also, instead of diallylmaleate, dimethylmaleate and other similar dialkyl and dialkenylmaleates can be used as the inhibiting agent. It is further within the scope of the instant invention to include conventional additives, in desired amounts, such as gum cure accelerators, controlled release agents, fillers, anti-microbial agents, pigments, dyes, mixtures thereof and the like, in the present compositions. All such obvious modifications are within the scope of the appended claims.

We claim:

1. A heat curable silicone composition having extended pot life at low temperatures and rapid curing at elevated temperatures comprising:
   (a) a vinyl containing polydiorganosilicone fluid;
   (b) a silicone hydride containing polydiorganosilicone;
   (c) a platinum group metal catalyst; and
   (d) an effective cure accelerating amount of a silane additive having at least two hydrogen atoms bonded to the silicon atom.

2. A heat curable silicone composition as defined in claim 1 wherein said vinyl containing polydiorganosilicone fluid (a) comprises compounds having the general formulae:

$$M^{vi}D_xM^{vi} \text{ or } M^{vi}D_xD_yM^{vi}$$

wherein M$^{vi}$ comprises

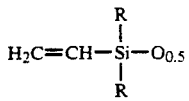

units, D$_x$ comprises

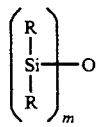

units, D$_y$ comprises

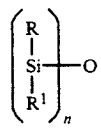

units, and wherein R is, independently, a monovalent hydrocarbon radical free of unsaturation having up to about 8 carbon atoms, R$^1$ is a hydrocarbon radical having alkenyl unsaturation of from 2 to 20 carbon atoms, and m and n are positive integers such that said vinyl containing silicone fluid has up to about 20% by weight R$^1$ groups.

3. A heat curable silicone composition as defined in claim 1 wherein said vinyl containing polydiorganosilicone fluid (a) is a vinyl containing polydimethylorganosilicone fluid.

4. A heat curable silicone composition as defined in claim 1 wherein said vinyl containing polydiorganosilicone fluid (a) is present in an amount ranging from 50 to 99 parts by weight based on the total weight of the silicone composition.

5. A heat curable silicone composition as defined in claim 1 wherein said silicone hydride containing polydiorganosilicone (b) is present in an amount ranging from about 0.5 to about 30 percent by weight based on the total weight of the silicone composition.

6. A heat curable silicone composition as defined in claim 1 wherein said platinum group metal catalyst (c) comprises a platinum-siloxane complex of tetramethyltetravinylcyclotetrasiloxane with platinum.

7. A heat curable silicone composition as defined in claim 1 wherein said platinum group metal catalyst (c) is a complex of 1,3-divinyltetramethyldisiloxane with platinum.

8. A heat curable silicone composition as defined in claim 1 wherein said platinum group metal catalyst (c) is present in an amount ranging from about 5 to about 200 parts per million by weight of platinum per mole of silane in said composition.

9. A heat curable silicone composition as defined in claim 1 wherein said silane additive (d) comprises compounds having the general formula R$^2$$_2$SiH$_2$ or R$^2$SiH$_3$ where R$^2$ is selected from the group consisting of alkyl radicals, cycloalkyl radicals and phenyl radicals.

10. A heat curable silicone composition as defined in claim 9 wherein said silane additive (d) is selected from the group consisting of diphenylsilane, dioctylsilane, methyldecylsilane, phenylsilane, phenylmethylsilane and didecylsilane.

11. A heat curable silicone composition as defined in claim 10 wherein said silane additive (d) is diphenylsilane.

12. A heat curable silicone composition as defined in claim 10 wherein said silane additive (d) is selected from the group consisting of phenylsilane, octylsilane and decylsilane.

13. A heat curable silicone composition as defined in claim 12 wherein said silane additive (d) is phenylsilane.

14. A heat curable silicone composition as defined in claim 1 wherein said silane additive (d) is present in an amount ranging from about 5 to about 200 parts per million based on the total weight of the silane composition.

15. A heat curable silicone composition as defined in claim 1 further comprising (e) an inhibiting agent effective to prevent premature cure of a one-package composition and to extend the shelf-life of a stored composition and the pot-life of a composition in use.

16. A heat curable silicone composition as defined in claim 15 wherein said inhibiting agent (e) is selected from the group consisting of dialkenylmaleates, dialkylmaleates, acetylenic alcohols, amines, isocyanurates, ene-ynes, vinyl acetates, acetylene dicarboxylates and mixtures thereof.

17. A heat curable silicone composition as defined in claim 16 wherein said inhibiting agent (e) is selected from the group consisting of diallylmaleate, dimethylmaleate, 4-butyne-1-ol, tetramethyl ethylenediamine and mixtures thereof.

18. A heat curable silicone composition as defined in claim 15 wherein said inhibiting agent (e) is present in an amount ranging from about 0.05 to about 0.5 percent by weight based on the total weight of the silicone composition.

19. A liquid injection moldable heat curable silicone composition having extended pot life at low temperatures and rapid curing at elevated temperatures with a low viscosity in the uncured state and a high physical strength in the cured state comprising the heat curable silicone composition as defined in claim 1.

20. A method for preparing a heat curable silicone composition comprising mixing (a) a vinyl containing polydiorganosilicone fluid; (b) a silicone hydride containing polydiorganosilicone; (c) a platinum group metal catalyst; and (d) an effective cure accelerating amount of a silane additive which comprises silicon bound to greater than or equal to two hydrogen atoms.

21. A method as defined in claim 20 wherein said vinyl containing polydiorganosilicone fluid (a) comprises compounds having the general formulae:

$$M^{vi}D_xM^{vi} \text{ or } M^{vi}D_xD_yM^{vi}$$

wherein $M^{vi}$ comprises $$H_2C=CH-\underset{R}{\underset{|}{\overset{H}{\overset{|}{Si}}}}-O_{0.5}$$

units, $D_x$ comprises

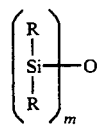

units, $D_y$ comprises

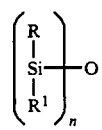

units, and wherein R is, independently, a monovalent hydrocarbon radical free of unsaturation having up to about 8 carbon atoms, $R^1$ is a hydrocarbon radical having alkenyl unsaturation of from 2 to 20 carbon atoms, and m and n are positive integers such that said vinyl containing silicone fluid has up to about 20% by weight $R^1$ groups.

22. A method as defined in claim 21 wherein said vinyl containing polydiorganosilicone fluid (a) is a vinyl containing polydimethylorganosilicone fluid.

23. A method as defined in claim 20 wherein said vinyl containing polydiorganosilicone (a) is added in an amount ranging from about 50 to about 99 parts by weight based on the total weight of the silicone composition.

24. A method as defined in claim 20 wherein said silicone hydride containing polydiorganosilicone (b) is present in an amount ranging from about 0.5 to about 30 percent by weight based on the total weight of the silicone composition.

25. A method as defined in claim 20 wherein said platinum group metal catalyst (c) comprises a platinum-siloxane complex of tetramethyltetravinylcyclotetrasiloxane with platinum.

26. A method as defined in claim 20 wherein said platinum group metal catalyst (c) is a complex of 1,3-divinyltetramethyldisiloxane with platinum.

27. A method as defined in claim 20 wherein said platinum group metal catalyst (c) is present in amount ranging from about 5 to about 200 parts per million based on the total weight of the silicone composition.

28. A method as defined in claim 20 wherein said silane additive (d) comprises compounds having the general formula $R^2_2SiH_2$ or $R^2SiH_3$ where $R^2$ is selected from the group consisting of alkyl radicals, cycloalkyl radicals and phenyl radicals.

29. A method as defined in claim 28 wherein said silane additive (d) is selected from the group consisting of diphenylsilane, dioctylsilane, methyldecylsilane, phenylsilane, phenylmethylsilane and didecylsilane.

30. A method as defined in claim 29 wherein said silane additive (d) is diphenylsilane.

31. A method as defined in claim 28 wherein said silane additive is selected from the group consisting of phenylsilane, octylsilane and decylsilane.

32. A method as defined in claim 31 wherein said silane additive is phenylsilane.

33. A method as defined in claim 20 wherein said silane additive (d) is present in an amount ranging from about 5 to about 200 parts per million based on the total weight of the silicone composition.

34. A method as defined in claim 20 further comprising (e) an inhibiting agent effective to prevent premature cure in a one-package composition and to extend the shelf-life of a stored composition and the pot-life of a composition in use.

35. A method as defined in claim 34 wherein said inhibiting agent (e) is selected from the group consisting of dialkenylmaleates, dialkylmaleates, acetylenic alcohols, amines, isocyanurates, ene-ynes, vinyl acetates, aectylene dicarboxylates and mixtures thereof.

36. A method as defined in claim 35 wherein said inhibiting agent (e) is selected from the group consisting of diallylmaleate, dimethylmaleate, 4-butyne-1-ol, tetramethyl ethylenediamine and mixtures thereof.

37. A method as defined in claim 34 wherein said inhibiting agent (e) is present in an amount ranging from about 0.05 to about 0.5 percent by weight based on the total weight of the silicone composition.

38. A coated article comprising a substrate coated with the heat curable silicone composition as defined in claim 1.

39. A coated article as defined in claim 38 wherein said substrate is selected from the group consisting of paper, polyethylene coated kraft (PEK) paper, super-calendered kraft paper, polyethylene films and polypropylene films.

40. A method for forming a coated article comprising
  (i) mixing (a) a vinyl containing polydiorganosilicone fluid, (b) a silicone hydride containing polydiorganosilicone, (c) a platinum group metal catalyst, and (d) a silane cure accelerating additive which comprises a silicon bound to greater than or equal to two hydrogen atoms;
  (ii) coating a substrate with the mixture formed in step (a); and
  (iii) curing the coated substrate by heating to a temperature of less than about 150° C.

41. A method as defined in claim 40 wherein step (i) further comprises mixing (e) an inhibiting agent effective to prevent premature cure of the mixture and to extend the shelf-life of stored mixture and the pot-life of the mixture in use.

42. A method as defined in claim 40 wherein said curing temperature is less than about 125° C.

43. A method as defined in claim 42 wherein said curing temperature is less than about 110° C.

* * * * *